Jan. 26, 1971 O. L. SEDA 3,558,405
FILM OR TAPE SPLICER APPARATUS
Filed May 9, 1969 3 Sheets-Sheet 1

INVENTOR.
ORLANDO LOUIS SEDA
BY
ATTORNEY

INVENTOR.
ORLANDO LOUIS SEDA
BY Michael Ebert
ATTORNEY

FILM OR TAPE SPLICER APPARATUS

Filed May 9, 1969 3 Sheets-Sheet 3

INVENTOR.
ORLANDO LOUIS SEDA
BY Michael Ebel
ATTORNEY

United States Patent Office 3,558,405

Patented Jan. 26, 1971

3,558,405

FILM OR TAPE SPLICER APPARATUS

Orlando Louis Seda, New York, N.Y., assignor to Sarex Corporation, North Bergen, N.J., a corporation of Delaware Filed May 9, 1969, Ser. No. 823,303
Int. Cl. B31f *5/00;* G03d *15/04*
U.S. Cl. 156—506 9 Claims

ABSTRACT OF THE DISCLOSURE

Tape splicer apparatus in which the butted ends of two tapes to be joined are held in a fixture. Also provided is a retractable splicer assembly in a position normally raised above the fixture, the assembly including a die plate having a die opening therein and a punch adapted to enter the opening. The arrangement is such that when the assembly is lowered over the fixture, the die opening, whose profile corresponds to that of the desired splicing piece, lies in precise registration with the butted ends of the tapes. Extending through a channel passing over the die opening is an adhesive splicing tape which is transported intermittently between a feed roll disposed on one side of the die plate and a take-up roll disposed on the other side thereof. Associated with the splicer assembly is an operating mechanism which, when actuated, first acts to index the take-up roll to present an uncut section of the splicing tape over the die opening, and then functions to drive the punch through the die opening, thereby cutting a splicing piece from said section and pressing the piece onto the butted ends of the tapes.

BACKGROUND OF THE INVENTION

This invention relates generally to the splicing of magnetic tape or motion picture film, and more particularly to a semi- or fully automatic splicer adapted to die-cut a splicing piece from an adhesive tape and to apply the piece separated from the adhesive tape to the ends of the tape or film to be joined.

Magnetic tape is widely used in recording and reproducing various forms of intelligence. This is accomplished by converting the intelligence into electrical signals representative thereof and applying the signals to an electromagnetic transducer associated with the tape. Thus magnetic tape is currently used to record and play back audio and video signals, as well as to store and process data in computers and in other electronic devices.

In audio tape-recording, selections recorded at different times and places are often later assembled on the same tape. This is done by joining the trailing edge of the tape on which one selection is recorded to the leading edge of the tape containing the next selection. The junction of the two tapes is called a "splice." Magnetic-tape splices differ from those employed in motion picture film in that there is no overlap of the ends, for in splicing magnetic tapes, the ends are butted together. While the present invention will be disclosed in connection with the semi- or fully automatic splicing of magnetic tape, it is to be understood that the splicer is also effective in joining together the ends of films or other webs.

The usual technique for splicing magnetic tape is to apply a pre-cut piece of very light and thin adhesive tape, known as splicing tape, to the butted ends of the tape, the adhesive being pressed firmly into place to link the ends together. Video tape is spliced in the same manner as audio tape except that the placement of the splice must be within the vertical blanking interval to avoid loss of image.

Many jigs or fixtures are commercially available to facilitate the splicing of tape in all widths. In a typical fixture for this purpose, a longitudinal groove is formed in a block to accommodate the tape to be spliced. Both ends of the tape to be spliced are placed in the groove with their coated sides down. To insure a perfect butt splice, the ends to be joined are overlapped slightly above a vertical slit in the fixture, and a cut is made through the overlapped ends with a razor blade. The small, loose ends are discarded and a pre-cut piece of splicing tape is then applied by hand to the junction and rubbed firmly in place.

In splicing, it is important that the pre-cut piece be just slightly narrower in width than the tape itself, so that it does not protrude past the edge of the tape and cause a jam-up in the machine. In a manual splicing operation, this is difficult to accomplish, and great care must be exercised in precisely applying the splice to the joint. One must also avoid touching the adhesive surface of the splicing piece, for this will adversely affect its bonding properties and may result in a defective splice.

The commonly practiced manual technique for splicing tape is not only troublesome to carry out correctly, but it represents an inefficient, time-consuming and costly operation. For example, editing a tape which has been recorded may entail as many as fifty splices. Unless each of these splices is properly applied, problems will be encountered in reproducing the spliced tape.

With the growing interest in tape cartridges or cassettes, it also becomes necessary to splice the ends of the tape onto leaders. In mass production, manual splicing techniques considerably slow down the assembly of cartridges, Also in some instances, tapes are made in endless loops, and in this situation one needs to splice together the ends of the tape. Manual splicing for this purpose has obvious drawbacks.

In the case of magnetic-tape disc packs or reels for computers, one is required to apply metallized adhesive pieces to the tape. These metallized pieces serve as markers and are later sensed to carry out certain control functions. Heretofore, such markers have been applied in the same manner as splices, with all of the attendant disadvantages. In this context, a defectively applied marker may have serious consequences and make it necessary to put the computer out of operation for an extended period. In some instances, one is required to apply marker pieces which have an optically reflective surface to be sensed in the course of operation.

BRIEF DESCRIPTION OF THE INVENTION

In view of the foregoing, it is the main object of this invention to provide a semi- or fully-automatic splicer which is adapted to die-cut pieces from an adhesive splicing tape and to apply the pieces to the ends of the tape or film to be joined.

More particularly, it is an object of the invention to provide a splicer of the above-described type adapted to die-cut a splicing piece having a rounded profile or a profile free of sharp corners to avoid interference in operation with elements of the magnetic-tape transport mechanism.

Still another object of the invention is to provide a splicer which lends itself to high-speed operation and which quickly and efficiently applies the splicing piece at the precise position required, thereby avoiding protruding edges.

A significant feature of the invention is that the splicing tape is mechanically handled and never comes into contact with the hands of the operator, thus preserving the optimum adhesive qualities thereof.

Briefly stated, these objects are accomplished in a splicer in which a fixture for holding the two ends of the tape in butting relation is mounted on a bed on which a retractable splicer assembly is hinged, the assembly normally being raised above the fixture. The assembly includes a die plate whose opening is adapted to receive a punch, the arrangement being such that when the assembly is lowered over the fixture, the die opening lies in registration with the butted ends of the tapes.

Extending through a channel passing over the die opening is an adhesive splicing tape which is transported between a feed roll and a take-up roll. An operating mechanism is provided which, when actuated, first acts to index the take-up roll to present an uncut section of the splicing tape over the die opening, and then functions to drive the punch therethrough, thereby cutting a spliced piece from the section and pressing the piece onto the butted ends of the tapes to join same.

BRIEF DESCRIPTION OF THE DRAWING

For a better understanding of the invention, as well as other objects and further features thereof, reference is made to the following detailed description to be read in conjunction with the accompanying drawing, wherein.

DESCRIPTION OF INVENTION

Figures 1, 8, 9:
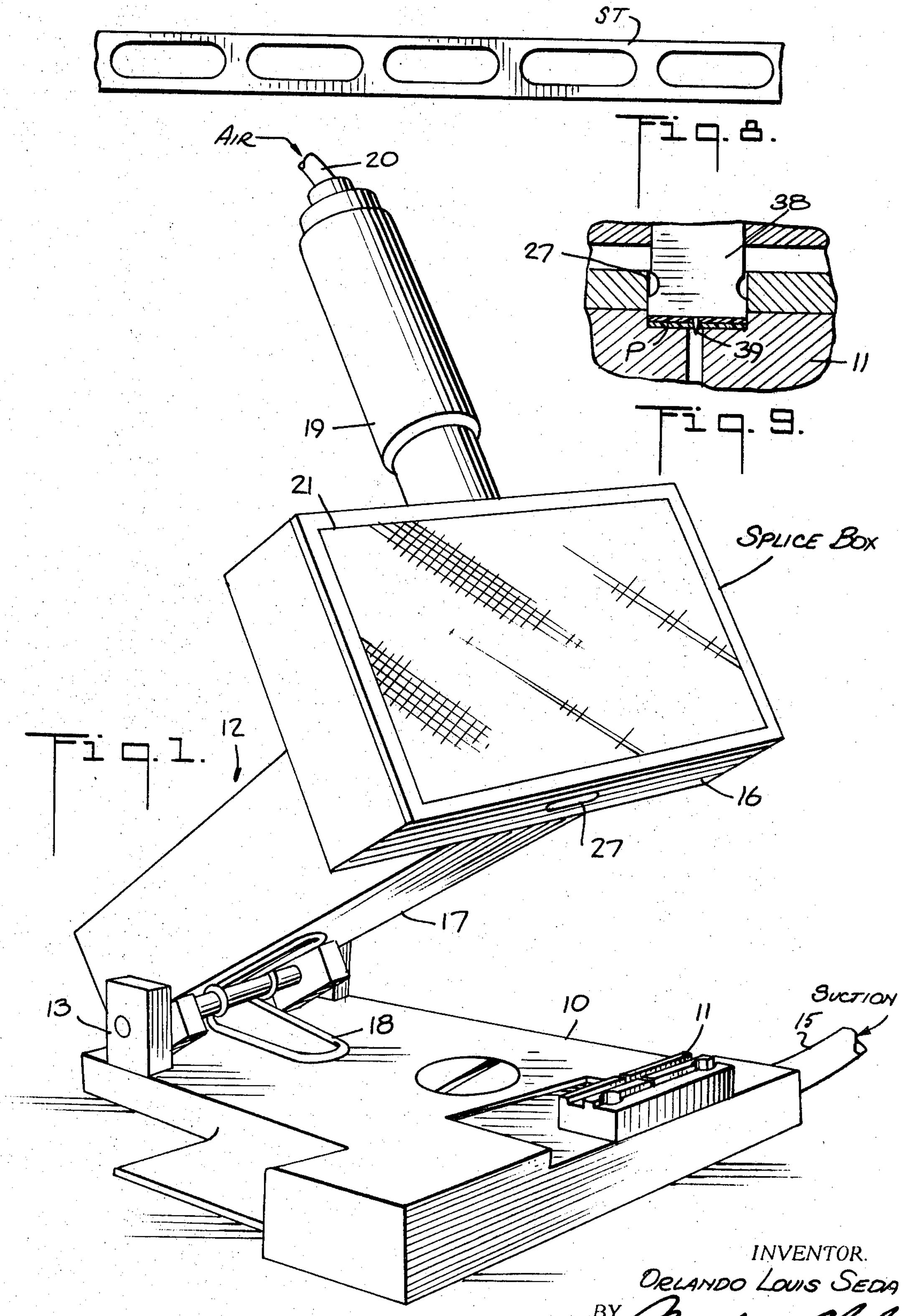
FIG. 1 is a perspective view of a tape splicer in accordance with the invention.
FIG. 8 is a plan view of the die-cut splicing tape, wound on the take-up roll.
FIG. 9 is an enlarged section showing the relationship of the punch, die plate and fixture.

Referring now to the drawings, and more particularly to FIG. 1, a splicer in accordance with the invention includes a base plate or bed 10 having a tape-holding fixture 11 mounted thereon adjacent the front edge, and a retractable splicer assembly, generally designated by numeral 12, pivotally mounted on trunnions 13 disposed adjacent the rear edge of the bed.

Figure 2:
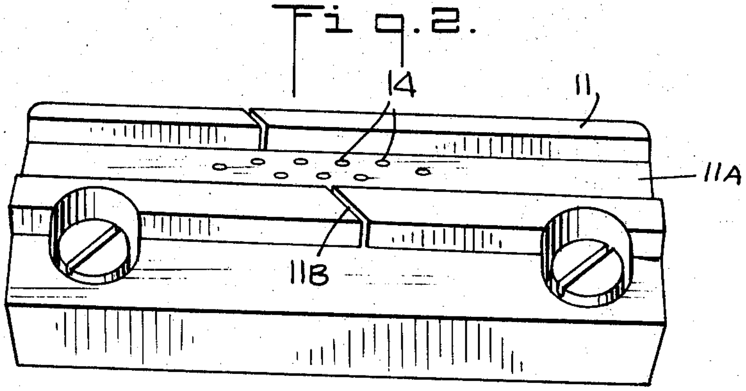
FIG. 2 is a perspective view of the tape holding fixture.
Figures 3, 4, 7:
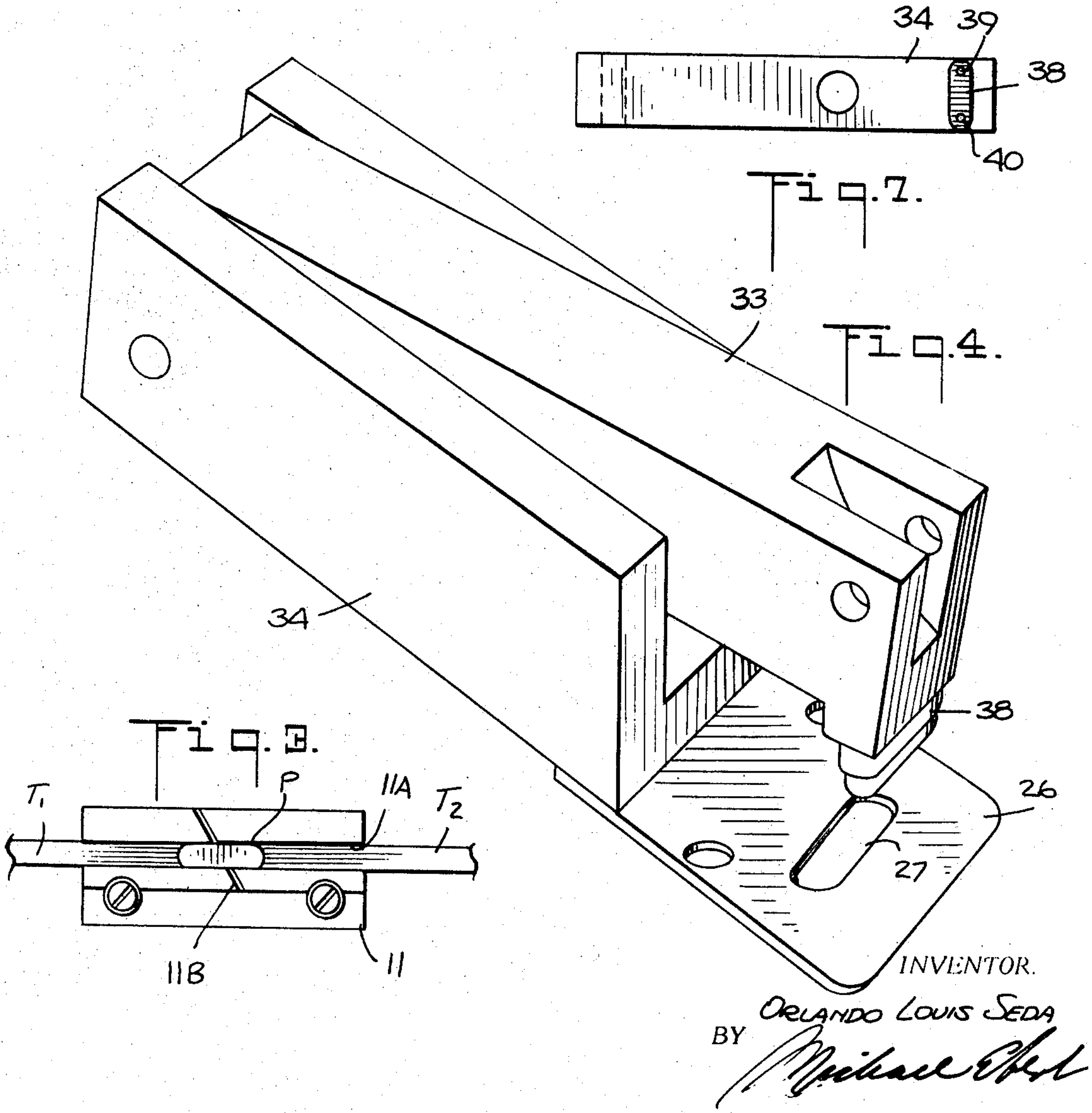
FIG. 3 is a plan view of the fixture with a magnetic tape having a splicing piece thereon.
FIG. 4 is a perspective view of the punch and die plate structure.
FIG. 7 is a plan view of the punch.

As best seen in FIGS. 2 and 3, fixture 11 is constituted by a rectangular block having a longitudinal track 11A formed therein to receive the ends of two tapes to be spliced. Cut vertically into the fixture at an angle to track 11A is a slit 11B. A cluster of pores 14 formed in the bottom of track 11A communicates with a pipe 11 leading to a vacuum pump (not shown), such that when the magnetic tape ends are placed in the track, they are held therein by suction.

In practice, as shown in FIG. 3, the tape ends $T_1$ and $T_2$ are placed in track 1A with their respective ends slightly overlapping on slit 11B. The overlap is excised by forcing a razor blade into slit 11B, and the small, loose waste pieces are discarded, thereby leaving the two tape ends in butting relationship. The splicer then operates to press an adhesive splicing piece P over the butt joint to effect a connection therebetween.

It will be seen that splicing piece P is generally rectangular in form and has a width slightly smaller than the width of the magnetic tape. The ends of the piece are rounded to avoid sharp corners which otherwise might in the course of magnetic-tape transport, be caught in the mechanism and cause the splice to peel off or be mutilated.

The splicer assembly 12 is constituted by a box 16 mounted at one end of a beam 17, the other end of the beam being pivoted in trunnion 13. A spring 18 placed under the beam at its hinge acts normally to maintain box 16 at an elevated position with respect to fixture 11. Mounted on the upper end of box 16 is a hydraulic or air cylinder 19 connected by a line 20 to a suitable pressurized fluid source (not shown). Box 16 is provided with a removable cover 21, the cover being removed when it is necessary to install a fresh supply of splicing tape.

Figure 5:
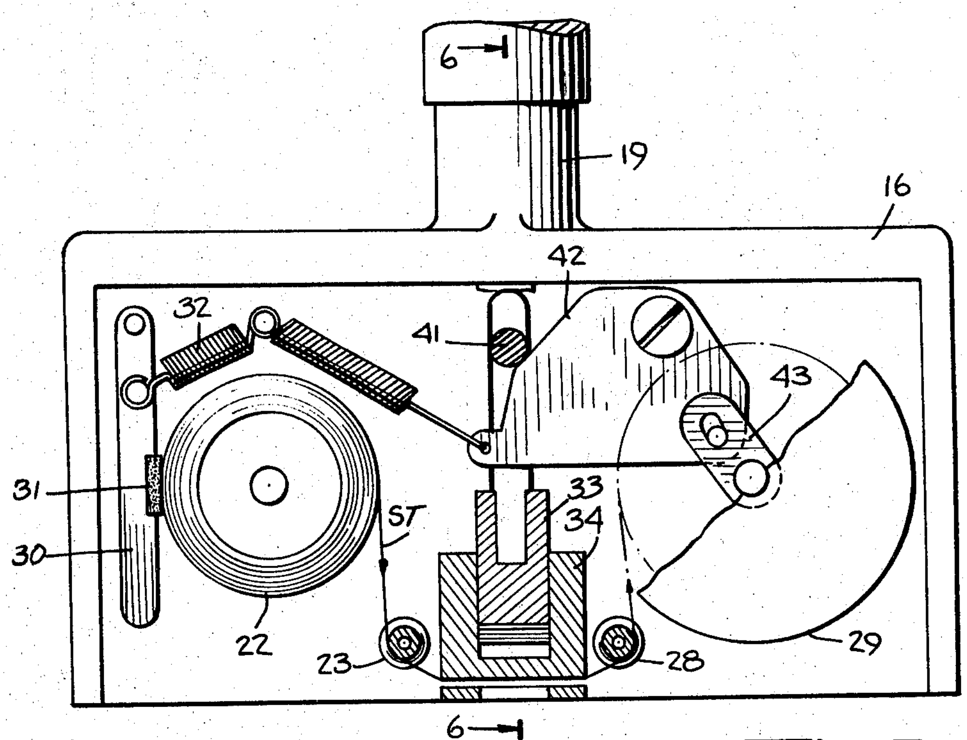
FIG. 5 is an elevational view of the transport mechanism for the splicing tape.
Figure 6:
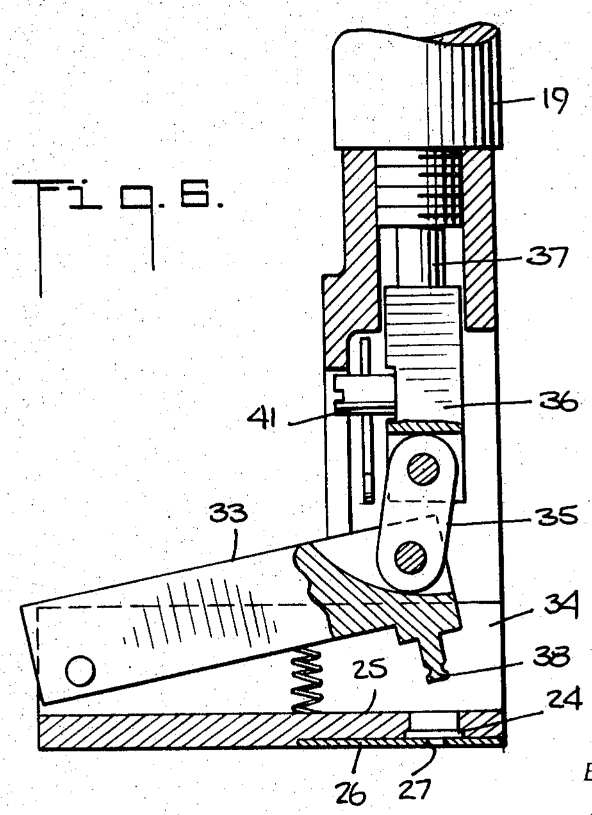
FIG. 6 is a section taken in the plane indicated by line 6—6 in FIG. 5, showing the operating mechanism for the transport mechanism.

As best seen in FIGS. 5 and 6, housed within box 16 is a splicing-tape transport mechanism including a feed roll 22 on which is wound a thin adhesive splicing tape ST which, in practice, may be formed of one-mil polyester ribbon having a high quality pressure-sensitive adhesive coating on one face thereof.

Splicing tape ST, drawn from feed roll 22, is conveyed under pulley 23 through a channel 24 formed in a platen 25, below which is secured a die plate 26 having a die opening 27 therein, the tape then traveling via pulley 28 to a take-up roll 29. In operation, the take-up roll is indexed to present a fresh section of splicing tape across die opening 27 before each punch action. A hold-back braking action is imposed by means of a tension arm 30 having a friction shoe 31 which engages the periphery of the splicing tape wound on feed roll 22, the arm being urged thereagainst by a spring 32.

As shown in FIGS. 4 and 6, the punch structure is constituted by an arm 33, the rear of which is pivotally connected to a channel-shaped guide bar 34, whereby the arm is swingable within the guide in the vertical plane. The tolerances of the arm and guide bar are such as to prevent any lateral play of the arm.

The front end of arm 33 is of forked construction, the fork embracing and being pivotally connected to a link member 35 which in turn, is pivotally connected to a coupling head 36. Head 36 is attached to the end of a piston rod 37 which reciprocates within the operating cylinder 19.

Projecting below the front end of arm 33 is a punch element 38 which, as shown in FIG. 7, has an oblong configuration. Two small needles 39 and 40 are extended from the surface of punch 38, the needles acting to capture the die-cut splicing piece when the punch cuts through the section of the tape presented thereto in entering the die opening.

The position of die opening 27 is in registration with the butted ends of the tape when the splicing assembly is lowered over fixture 11, and when cylinder 19 is actuated to drive punch 28 through the die opening, the die-cut splicing piece captured by the punch is pressed against the butted ends of the tape and adheres thereto, so that the needles withdraw from the splicing piece when the punch is retracted. In the design of the die and punch structure, it is important that these elements be precisely matched, for otherwise should clearance exist therebetween, the splicing tape, instead of being cut, will extrude through the clearance.

Head 36 at the end of piston 37 is provided with a pin 41 projecting laterally therefrom, which pin engages the periphery of a pivoted cam plate 42. Cam plate 42 is linked to a crank arm 43 coupled to the shaft of takeup roll 29. The profile of the cam plate is such that when pin 41 moves downwardly with the forward thrust of piston rod 37, it acts to rock crank arm 43 and thereby to index the take-up roll and to cause a fresh section of the splicing tape to be presented before the punch makes contact therewith. The take-up roll 29 is provided with a unidirectional clutch or pawl arrangement (not shown) of standard design to prevent retrograde motion thereof. When pin 41 is raised upon retraction of piston rod 37, the cam plate is returned to its initial position by spring 44. It will be seen in FIG. 8 that the adhesive tape AT wound on the take-up roll has a series of punch holes therealong, each hole being formed each time the die-cutting operation takes place.

The operation of the splicer may be made semi-automatic. In the former instance, an operator manually swings down the splicer assembly into engagement with the fixture and then presses a control valve for operating cylinder 19 to cause a piece of splicing tape to be die-cut and applied to the butted ends of the tapes.

In automatic operation, the function of lowering the assembly into engagement with the fixture and actuating the control valve, may be effected by a motorized mechanism whose operation is coordinated with the movement of the magnetic tape or film in the fixture. Again, it must be noted that the invention is also useful in applying metallized markers rather than splices to a tape, where such markers are called for in computer tapes, or in other contexts.

It is not essential that the retractable splicing assembly operate on a swingable beam as shown, for this operation may be effected by an up-and-down elevator movement. In practice, various die-opening contours may be used, the configuration being appropriate to the intended purpose. For example, in some instances a bomb-shaped splicing piece is desirable, for in this shape the tapered front portion facilitates entry of the piece through the magnetic-tape transport mechanism.

While there has been shown and described a preferred embodiment of film or tape splicer apparatus in accordance with the invention, it will be appreciated that many changes and modifications may be made therein without, however, departing from the essential spirit of the invention.

What I claim is:

1. Apparatus for applying a piece of adhesive splicing tape to a magnetic tape or the like at a predetermined position thereon, said apparatus comprising:

(A) a fixture having a track to accommodate a portion of said magnetic tape, and (B) a retractable assembly having a raised position and a lowered position with respect to said fixture, said assembly including:

(a) a die-plate having a contoured opening therein, said opening being in registration with said tape portion when said assembly is lowered, (b) a punch adapted to enter said opening, the shape of said punch conforming to the contour of said opening, (c) means for conveying a splicing tape from a feed roll across said die-plate over the opening therein to a take-up roll, and (d) an operating mechanism coupled to said take-up roll and to said punch, said mechanism having an operating cycle in which first said take-up roll is indexed to pull tape from said feed roll to present a section of uncut splicing tape over said opening, and then said punch is driven through said opening to die-cut a piece from said section and to press it over said magnetic tape portion.

2. Apparatus as set forth in claim 1, wherein said fixture includes a vertical slit in a plane transverse to said track to permit overlapped tape ends to be cut off to provide butted ends of tape to be spliced.

3. Apparatus as set forth in claim 1, further including pores in the bottom of said fixture track communicating with a vacuum pump to produce a suction force holding the tape portion on said track.

4. Apparatus as set forth in claim 1, wherein said fixture is fixedly mounted on a bedplate and said assembly is mounted on one end of a beam whose other end is hinged to said bedplate, a spring urging said beam upwardly to normally raise said assembly.

5. Apparatus as set forth in claim 1, wherein said opening has an oblong configuration.

6. Apparatus as set forth in claim 1, wherein said opening has a bomb-shaped configuration.

7. Apparatus as set forth in claim 1, wherein said operating mechanism includes an air cylinder having a piston whose rod is operatively coupled by a cam mechanism to said take-up roll and is directly linked to said punch.

8. Apparatus as set forth in claim 1, wherein said splicing tape has an adhesive layer on one side and a metallized layer on the other side to provide a marker for a magnetic tape.

9. Apparatus as set forth in claim 1, wherein said splicing tape has an adhesive layer on one side and a reflective layer on the other.

References Cited

UNITED STATES PATENTS

| | | | |
|---|---|---|---|
| 3,155,563 | 11/1964 | Jorgensen ---------- | 156—505 |
| 3,346,437 | 10/1967 | Post et al. ---------- | 156—505 |

BENJAMIN A. BORCHELT, Primary Examiner

D. A. HART, Assistant Examiner

U.S. Cl. X.R.

156—502